United States Patent [19]

Nordstrom et al.

[11] Patent Number: 5,265,245
[45] Date of Patent: Nov. 23, 1993

[54] HIGH CONCURRENCY IN USE MANAGER

[75] Inventors: Michael L. Nordstrom, Oronoco; Gary R. Ricard, Rochester; John J. Vriezen, Zumbrota; David R. Welsh; Larry W. Youngren, both of Rochester, all of Minn.

[73] Assignee: International Business Machines Corporation, Armonk, N.Y.

[21] Appl. No.: 895,176

[22] Filed: Jun. 5, 1992

Related U.S. Application Data

[63] Continuation of Ser. No. 339,286, Apr. 17, 1989, abandoned.

[51] Int. Cl.⁵ .................. G06F 12/00; G06F 15/40
[52] U.S. Cl. .................. 395/600; 395/425; 395/650; 364/246; 364/246.6; 364/246.8; 364/282.1
[58] Field of Search ............ 395/650, 600, 700, 425, 395/575

[56] References Cited

U.S. PATENT DOCUMENTS

| | | | |
|---|---|---|---|
| 3,683,418 | 8/1972 | Martin | 364/200 |
| 4,435,766 | 3/1984 | Haber et al. | 364/200 |
| 4,480,304 | 10/1984 | Carr et al. | 364/200 |
| 4,574,350 | 3/1986 | Starr | 364/200 |
| 4,604,694 | 8/1986 | Hough | 364/200 |
| 4,697,266 | 9/1987 | Finley | 371/12 |
| 4,989,132 | 1/1991 | Mellender et al. | 395/700 |

OTHER PUBLICATIONS

J. N. Gray, "Notes on Database Operating Systems," Chapter 3.F. pp. 394-481 from *Operating Systems*, 1977.
Encyclopedia of Computer Science, Price, C. E., "Table Lookup," pp. 1393-1400, 1976.
H. P. Schlaeppi and H. S. Warren, IBM Technical Disclosure Bulletin, vol. 25, No. 3A, dated Aug. 1982, pp. 1304-1307; Live/Dead Tags on Computer Registers.
IBM Technical Disclosure Bulletin, vol. 29, No. 3, dated Aug. 1986, pp. 1224-1227, Tracing, Formatting and Storage Referencing in An MVS Multitasking On-line System.

*Primary Examiner*—Paul V. Kulik
*Attorney, Agent, or Firm*—Andrew J. Dillon

[57] ABSTRACT

An in use table manager in a computer system uses an in use table to track the use of files, or objects. The in use table is used to determine which objects may need recovery in the event of a system failure. Object addresses are hashed by the in use manager to identify a preferred slot in the table. The slots contain information identifying the object, and indicating the extent of use of the object. The in use manager assigns alternate slots, and dynamically changes the size of the in use table to reduce contention for slots. Several atomic operations on the table ensure integrity of the table, while permitting concurrent use. Portions of the table are bundled into single I/O operations to enhance system performance by minimizing I/O.

21 Claims, 5 Drawing Sheets

HIGH CONCURRENCY IN USE MANAGER

This application is a continuation of application Ser. No. 07/339,286 filed Apr. 17, 1989, now abandoned.

BACKGROUND OF THE INVENTION

The present invention is related to recovery of database objects in a computer system, and in particular, to an in use manager for tracking use of database objects to ensure quick recovery of the objects following abnormal system termination.

In a database system, recovery processing is normally required after an abnormal system termination in order to ensure that the integrity of the data within the database is preserved. Typically, database objects that were "in-use" at the time of the termination may need selective recovery actions performed. Objects are files of stored information, and usually include header data that describes the stored information. The header can also contain security information.

Information about which objects are in use is sometimes maintained in a central repository to guarantee that all objects are properly recovered if the system terminates abnormally. The central repository is commonly referred to as an in-use table. The table is used to identify the objects which were being used, and to limit recovery actions to those objects. It is desirable that the table be of modest size, be trustworthy following a crash, and not be a significant source of contention.

It would be possible to keep the information about which objects are in use directly within each object itself, but this is undesirable, because it would require that each and every object be paged into main memory from secondary storage and examined at system restart. This consumes too much time. Another possibility would be to record in-use status in an object directory. This is also impractical because there can be many directories within the system to search, and not all objects may be required to be in a directory (this is true on the IBM Application System/400 (TM)—some objects which require recovery are not stored in directories). In addition, many computer systems house a large quantity of rather dormant objects which are rarely used. It would be inefficient to exhaustively examine all such objects in the face of a crash in order to determine whether these objects require recovery processing. Instead, it is desirable to provide a mechanism which minimizes the number of objects which must be searched for potential recovery processing.

In the IBM System/38, an in use table consisted of a number of entries. Each entry corresponded to an object. The table itself was an object, and could be locked by a single process. This would serialize operations performed against the table, causing it to be a major bottleneck in the system. It was particularly true when objects were repetitively put in use and taken out of use at a high rate. The table was also searched in a linear manner. With a large table, the linear search was not efficient. The table was written to disk each time the table was modified. This resulted in a high rate of traffic on the input/output lines. These synchronous write operations were a major system bottleneck during high I/O traffic times. One further limitation of the table was that it only indicated if an object was in use. An object which is merely being read should not need to be recovered, since no changes were made.

OBJECTS OF THE INVENTION

It is an object of the invention to provide an in-use table manager which permits concurrent operations on the table by many different processes running on several different processors.

It is an object of the invention to provide an in-use table manager which quickly finds which table entry, if any is associated with a given object.

It is a further object of the invention to efficiently find an available free table entry when no entry is currently assigned.

It is yet a further object of the invention to minimize I/O activity against the table.

It is also an object of the invention to avoid unnecessary recovery actions against objects that are in use. Other objects and benefits are readily discernible upon further reading.

SUMMARY OF THE INVENTION

A single system-wide table has slots, each of which contains an address of an in-use object, along with sufficient information to signify which potential recovery actions each object must endure if the machine should terminate abruptly. Each slot corresponds to one object, such as a data base object or file. Once a data base object has been put in use at least once, it is assigned a slot within the table as its preferred synchronization point. A synchronization point is a slot in which activity relating to the object is stored. The slot remains its preferred synchronization point even during periods when the object ceases to be in use. A slot address is housed within the header of the object to provide a direct linkage back to the in use table.

An in use manager is used to lock individual slots. Individual locking prevents any one process trying to use the table for one object from locking the entire table from other processes. The in-use table manager also employs an efficient slot allocation mechanism. Newly created objects which have not previously been put in use, have an in-use slot address of zero. Upon the first attempt to place such an object in-use, the zero address causes the in-use table manager to assign a preferred slot to this object. The slot selection process is accomplished by mapping the virtual address of the object to a slot address. The identifier of the object, a segment id, is mapped by means of a hashing function which produces a valid in-use table entry address. This is stored in the header of the object. Since some objects hash to the same location, a method of allocating further slots includes attempting to allocate a slot on the same page of data to avoid retrieving a further page of the table from secondary storage into main storage.

The table manager also provides a method of varying the size of the in-use table. Throughout the lifetime of a computing system, the number of data base objects simultaneously in-use varies greatly. The table manager permits the table to both shrink and expand to efficiently allocate storage resources and improve the performance of the system. A history of the size of the table is kept to ensure that the table does not get too small. If a slot address is encountered in the header of an object that is larger than the present size of the table, the address is treated as if it were zero, and a new address is generated.

To minimize the total number of secondary storage (DASD - direct access storage device such as a disk drive) operations, unrelated slot modifications are bundled into a single I/O request. The manager also distinguishes between objects being genuinely modified and those being merely read. Prior to actual modification of an object, appropriate portions of the in-use table are written to secondary storage, if necessary.

The in use manager provides functions which permit many processes to operate concurrently on many objects. A counter in the slot is used to indicate the number of processes currently accessing an object. The processes may reside on more than one processor. Thus, the in use manager is well suited to a parallel processing environment.

DETAILED DESCRIPTION

Overview

Figure 1:
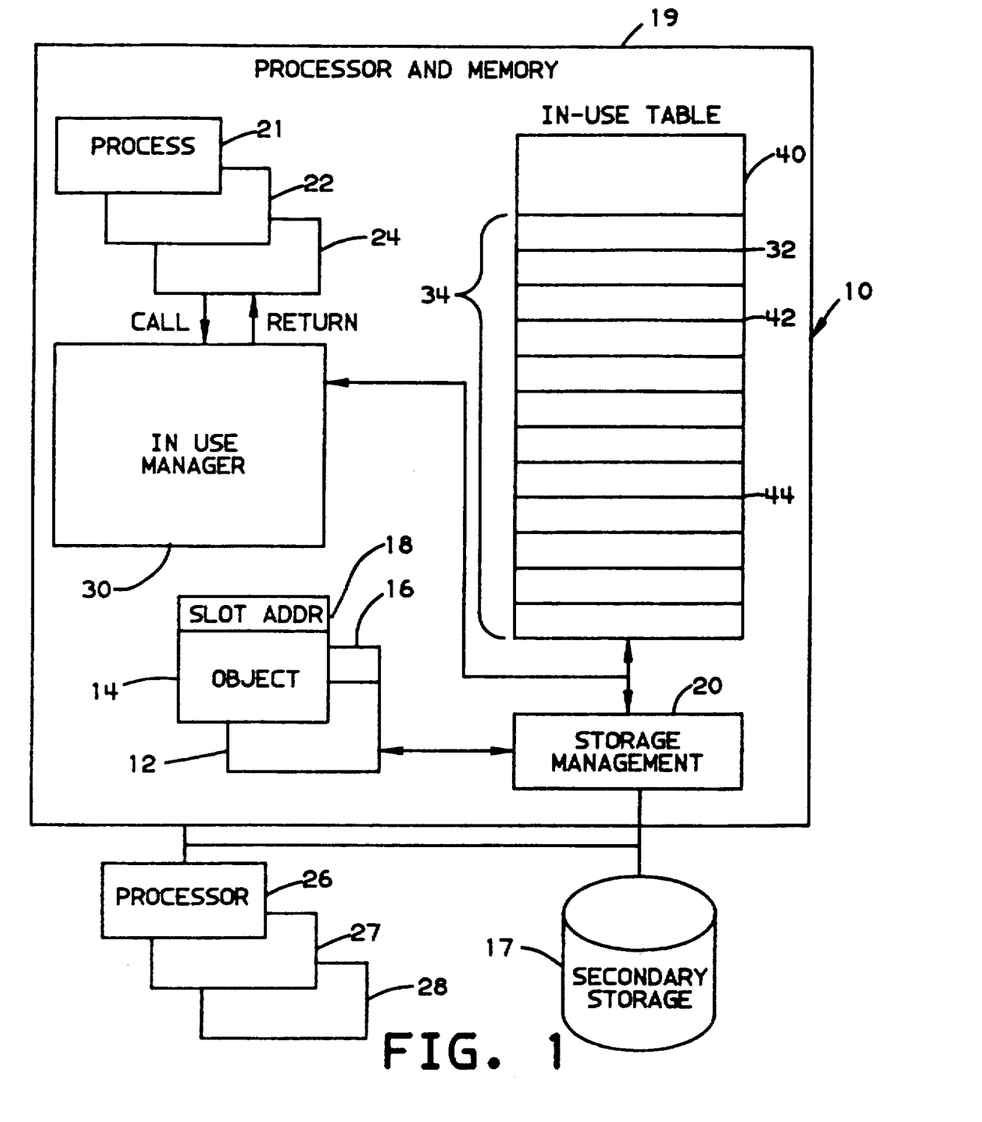
FIG. 1 is a block logic diagram view of an in use table manager in a multiprocess environment.

A block diagram of the present invention in logical form is shown in FIG. 1 generally at 10. A plurality of objects such as data base files 12, 14 contain data base information. The objects 12, 14 are preferably encapsulated data, the encapsulation comprising headers 16, 18 which contain information describing the data. Headers 16, 18 can indicate that the object contains data or programming or different types of information. The IBM System/38, and Application System/400 encapsulate most of the information that they handle into object form. Objects are stored on one or more 512 byte pages. The pages normally reside on secondary storage 17, and are paged into and out of a memory and processor 19 in a known manner by a storage management block 20. The addressing is preferably of the single level store type, where a single virtual address range is used for all of secondary storage 17. Memory block 19 is labeled as processor and memory 19. It is used as a logical representation of programs and data residing in storage of a processor, and executing in the processor.

A plurality of processes, 21, 22, 24 access the objects to perform work, such as searching of a data base file, or updating data therein. Processes also reside on processors 26, 27 and 28 which are similar to and coupled to processor and memory 19, as well as secondary storage 17. They also access objects to perform work. To access an object, a process residing on any processor makes a call to an in use manager 30, providing a virtual address of the object and the type of operation to perform. The in use manager 30 generates and maintains an in use table 32 which comprises a plurality of slots 34 for containing information about whether objects are being used by one or more processes. When receiving a call from a process, the in use manager 30 accesses the header of the object 14, using the virtual address, and looks at a field containing a slot address 18. If the slot address is zero, the in use manager will perform a hash of the virtual address of the object to arrive at a slot address in the in use table. The address is inserted in the object header, and identifies a preferred slot or entry in the in use table. This slot serves as a preferred synchronization point. Further activity related to changing the in use status will lock this slot prior to performing in use operations on the object.

As with other common hashes, several virtual addresses map into a single slot address. The in use manager will then insert the virtual address of the object into the slot entry, and set a flag to indicate that the object is in use. If there is a potential that the object will be modified by the process, an update flag in the slot entry is set to so indicate. In the event of abnormal system termination, this flag will be used during recovery to indicate which objects may need recovery actions to ensure that they are accurate.

While the slot is being accessed by the in use manager, the slot is locked from use by other processes. There are sixteen, 32 byte (eight bits per byte) slots on each page of the in use table. There is also a bit map on each page which is set by the in use manager to indicate which slots on a page are already occupied. If two objects hash to the same slot, one of the objects will be assigned a new slot on the same page if possible. The bit map is used to check which slots are available. If there are no slots available on the same page, a header 40 at the top of the in use table contains a further map of the pages which have available slots. The in use manager 30 also controls the size of the in use table 32. It adds slots based on the amount of use of the table, and to save space, can reduce the number of slots as use of the in use table diminishes. The result is an increase in the flexibility of resource allocation which is used to improve performance of the system.

In the preferred embodiment the table is permitted to shrink only during IPL (initial program load) while no objects are actively being used. In order to minimize the shrinkage, a sufficient history of the maximum size of the table during the past three IPL's is maintained. The average size is used to determine how large the table should be for the next IPL. Nonetheless, occasional table shrinkage may occur.

A preferred synchronization slot might have been assigned during a time when the table was larger than its current size. An object may be encountered whose preferred synchronization slot address is no longer within the bounds of the table. This is treated as an invalid in-use address, exactly as if it were zero. The object id is hashed afresh to a table entry and that entry is locked.

To expand the table, all access to the table is locked out. The in use manager then makes a request to storage manager 20 for a further 32K storage area when there are no longer any slots found which are not already assigned. When the requested storage is received, the size of the table in the header is updated, and the table wide lock is released.

The hashing function generates table entry addresses for records 1 to M where M is the last entry in the minimal size of the in-use table (the size it was assigned during IPL before any subsequent enlargement ensued). Thus, even if the in-use table expands thereafter, the hashing function maps the preferred synchronization point to a slot residing entirely within the first allocation. This practice assures that all users agree on the preferred location of this synchronization slot regardless of the current size of the underlying In-Use Table.

The desired property of the hashing function is to provide a nearly uniform mapping of the object IDs to the initially allocated in use table entries. This can be accomplished with following simple multiplicative congruential hash function. The object ID is multiplied by a large prime number. This product is then divided by the size of the initial allocation of the in use table.

HASH (object − ID) = (object − ID*Prime)modulo Initial-allocation.

Since multiple data base objects may hash to the same synchronization slot, the initial table size is therefore a determining factor of how much contention will be seen among objects being placed in-use. For our implementation an initial table size of 1,008 entries was used. This allows up to 1,008 concurrent operations on the in-use table. The initial size of the table is chosen as 32K bytes which also corresponds to the maximum amount that can be written to secondary storage in a single I/O operation. When adding another 32K byte storage area to the table, one is actually adding 1024 new slots because a new table header is not required in the additional 32K byte storage area. It is clear that other table sizes are within the scope of the invention, dependent on the performance characteristics of the computer system.

The header 40 also contains a low boundary pointer 42 and a high boundary pointer 44 which indicate the range of slots which should be written to secondary storage prior to an actual change to an object. The pointers actually reside in header 40, but are shown pointing to the actual slots to indicate a range of slots. In other words, data in slots outside this range has not been changed (update flag has not changed from 0 to 1) since the table was last written to secondary storage. This mechanism permits a single I/O operation to write all recently modified slots of the in use table as a single bundle rather than requiring an I/O operation for each modification to the in use table. The header also contains an I/O departure number identifying disk writes which are scheduled to take place. These scheduled departures are coordinated with corresponding I/O departure numbers residing within entries in the individual slots. Comparison of the entries by the in use manager with the I/O departure numbers reveals which slots have already been written to secondary storage.

The in-use table manager allows many activities to proceed concurrently. Since an in-use operation is on behalf of an object, it is possible to map that object to a specific entry (entry and slot are used interchangeably in the description) of the in-use table for synchronization purposes. This corresponding table entry is then locked exclusively to prevent other processes from simultaneously using this synchronization point.

Figure 2:
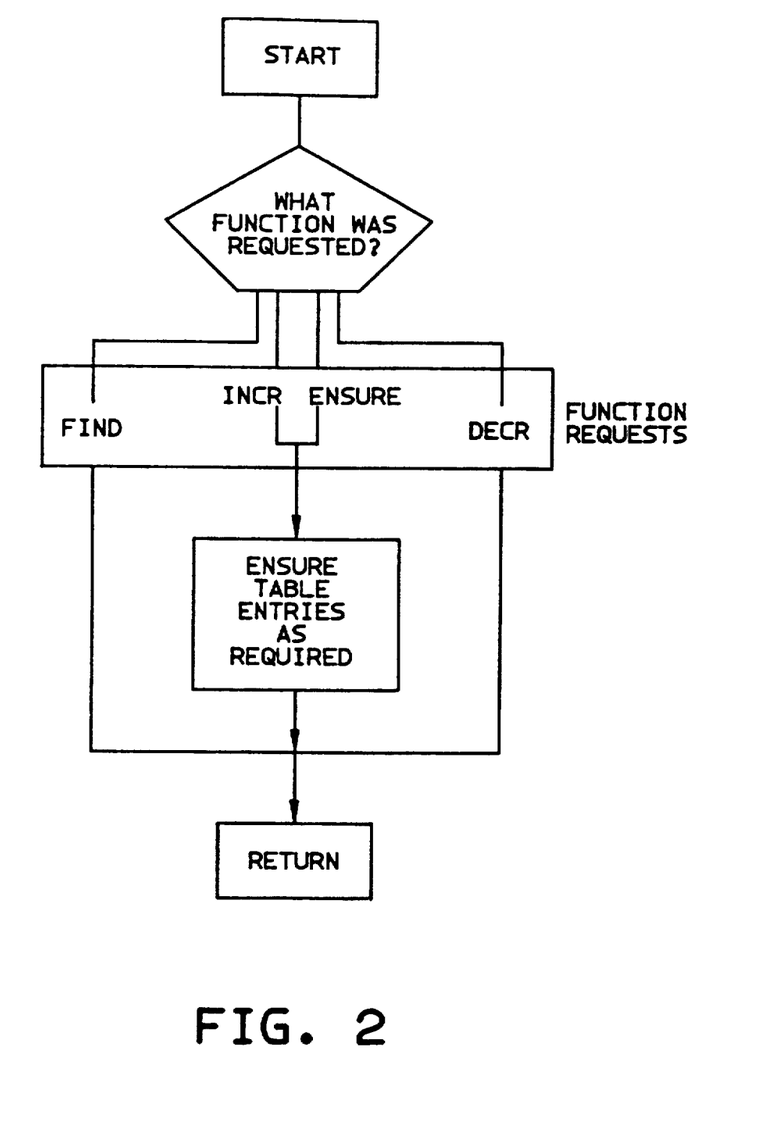
FIG. 2 is a high level flow diagram of the table manager of FIG. 1.

A high level block flow diagram of the in use manager is shown in FIG. 2. Information is retrieved from or stored into the in use table depending upon the function requested. For example, a FIND operation will only retrieve information from the table, whereas an INCR (increment) operation causes additional information to be placed into the in use table. A return code is returned to the process requesting the operation describing the results of the in use operation. The FIND operation is used to query information about the in use status of an object. INCR is used to place an object in use. If the object is already in use, then a use count in the table entry or slot is incremented by one. The DECR (decrement) function is the inverse of the INCR function. It is used to record a reduction of current users of the object referenced by the in use table slot.

A primary responsibility of the in use table manager is that it must ENSURE that all objects added to the volatile main memory copy of the table appear in the DASD copy of the table after a crash of the system. Since the table is modified in main memory, newly allocated in use entries must be written (also referred to as forced) to non volatile storage. This operation is referred to as ensuring the entries. The in use manager performs these functions with a minimum of I/O (input-/output) operations and resource contention on the table. Volatile storage as used herein refers to storage which can fail. It is important that the secondary storage be available as a backup copy of the in use table.

A Locking Method

The in-use table manager uses a lock field residing within each entry of the table to ensure that a slot is only accessed by one process at a time. The format of an entry is shown and described later with respect to FIG. 3. This is referred to as locking the entry. The field has two values: Locked—A process is using this entry for synchronization; and Unlocked—Entry is not locked by any process. In order to achieve high levels of concurrency with only modest overhead, advantage is taken of hardware instructions which perform atomic operations on data (operations which appear to be indivisible, such that in a multi-CPU (central processing unit) environment modification of such a lock field by one CPU will never be viewed in a partially completed state by a neighboring CPU). The preferred method of examining and changing the entry's lock field uses such an instruction (known as the Compare and Swap Halfword instruction in the Application System/400 processor) to modify lock fields. Another equally good alternative would be to use the Test and Set instruction available on some hardware platforms. Similar instructions exist on most modern computer systems and micro processors to perform indivisible examination and setting of storage operands in a multiprocessing environment.

Compare and swap is used to check the value of the entry's lock field. In Table 1, below, pseudo code is used to show how the compare and swap hardware instruction works. The hardware limits the number of compare and swap instructions concurrently executed on a variable "a" to 1. That is, access to the variable is serialized across all CPUs such that no destructive interference is permitted. The instruction is also atomic and not interruptible.

TABLE 1

```
procedure
    Compare_and_swap ( a , wethink, wewant, rc )
        { a is the storage location being operated on
            atomically }
        { wethink is the value variable a is assumed
            to contain }
        { wewant is new value we want variable a to
            be set to if }
        { a is equal to wethink. }
        if a = wethink
        then
            begin
                a := wewant;
                rc := compare_and_swap successful;
                    { rc is the return code }
            end
        else
            begin
                wethink := a;
                rc := compare_and_swap failed;
```

TABLE 1-continued

```
    end
end Compare_and_swap;
```

The pseudo-code shown in Table 2 below describes the logic of acquiring exclusive control of a table entry. When exclusive control is achieved, the entry is said to be locked. The notation: entry_address → lock, signifies a de-referencing of the pointer value (entry_address) thereby granting addressability to the lock field residing within the preferred synchronization slot of the in-use table entry addressed by the Variable known as entry_address. In the following code, the literal "locked" represents one state of the slot, and the literal "unlocked" represents the other state. The logic in Table 2 shows the method of obtaining exclusive control of an in-use table entry (such as the preferred synchronization slot for an object).

TABLE 2

```
acquire_entry : procedure ( entry_address )
    compare_and_swap ( entry_address -> lock.
                unlocked. locked, rc)
    while ( rc = compare_and_swap_failed )
        begin
            delay_task_briefly;
            compare_and_swap ( entry_address -> lock,
                    unlocked, locked. rc);
        end
end acquire_entry
```

The following logic in Table 3 shows the method of relinquishing exclusive control of an in-use table entry. This routine is only used in cases where the entry is already held exclusively by the invoking process and therefore no check for compare and swap success is necessary.

TABLE 3

```
release_entry : procedure ( entry_address )
    compare_and_swap ( entry_address -> lock.
                locked. unlocked, rc)
end Release_entry
```

A procedure is shown in Table 4 to get control of the "proper" entry for an object. It is called the "proper" slot because the first impression regarding the location of the slot which will serve to house recovery information regarding the data base object may need to be revised. Consider, for example, what happens when two objects, which have never been placed in-use previously, both hash to the same slot. The collision is handled by granting the slot to the first requestor and informing the second requestor to hereafter revise the location considered to be the preferred synchronization slot for this object. The revisions performed by the slot manager consist of replacing the zero slot address residing within the object header with the address of the revised slot. Any concurrently executing jobs which had sampled the old zero slot address initially attempt to lock the original slot by hashing the object address, only to discover that in the meantime the preferred slot location had been revised. Consequently, in highly concurrent environments, one may occasionally lock a slot presumed to be the "proper" slot only to discover after acquiring the lock that the "preferred" slot now resides elsewhere. The following pseudo code is provided in order to handle this condition. By using this mechanism, high levels of concurrency are supported and serialization of access at the data base object level is not required. Note that the object is mapped to an entry in a repetitive manner to handle the situation of discovering that the preferred slot resides elsewhere. Repetition is used to verify correct mapping. The in use manager discovers that the address in the table entry does not correspond to the object address which was hashed to identify the preferred slot. The mechanism provides a definite performance advantage.

TABLE 4

```
Procedure Concurrent_lock ( object_id, Var
            synch_entry_address)
    synch_entry_address := Nil;
    Map_object_to_entry( object_id,
            original_entry_address)
        {Provides our initial impression regarding
        the location of the "preferred" slot}
    Concurrent_success := false;
    Repeat
        Acquire_entry(original_entry_address);
        Map_object_to_entry( object_id,
                synch_entry_address);
            { This is the repetitive mapping described
            above, it reveals whether object still
            points to same slot}
        if { Object no longer maps to the entry we
            locked above . }
            synch_entry_address < >
                original_entry_address
        then
            Release_entry(original_entry_address);
            original_entry_address :=
                synch_entry_address;
        Else { The synchronization entry did not
            move }
            Concurrent_success := true;
    Until concurrent_success = true ;
end Concurrent_lock;
```

In-use Table Operations

This section describes a method of performing operations on the in use table in a concurrent environment.

A FIND operation is used by the in use manager to retrieve information from the table for a specific object. It is important that this operation be performed with minimal impact on other jobs or processes contending for the in use table as a whole, as well as low impact on those seeking to alter the in use status of the specific data base object whose status is sought. The following pseudo code in Table 5 conveys the method for FIND. The slot is first found, either by using the slot address in the object header, or if zero, hashing to the preferred slot address. The slot is locked while the FIND operation is being performed.

TABLE 5

```
Procedure In_Use_Find ( object_id, Var Entry_info,
        Find_return_code)
    Concurrent_lock( object_id, entry_address);
    if entry_address -> Entry.object_id =
            object_id
        { Slot referenced in the in use table
        knows something about the data base
        object }
    then
        begin
            { Return information found in in-use
            table for this entry to the user. }
            Return_entry_info(entry_address,
                entry_info)
            Find_Return_code := Find successful;
        end
    else
        Find_Return_code := Not in table;
        Release_entry(entry_address)
```

Figure 3:
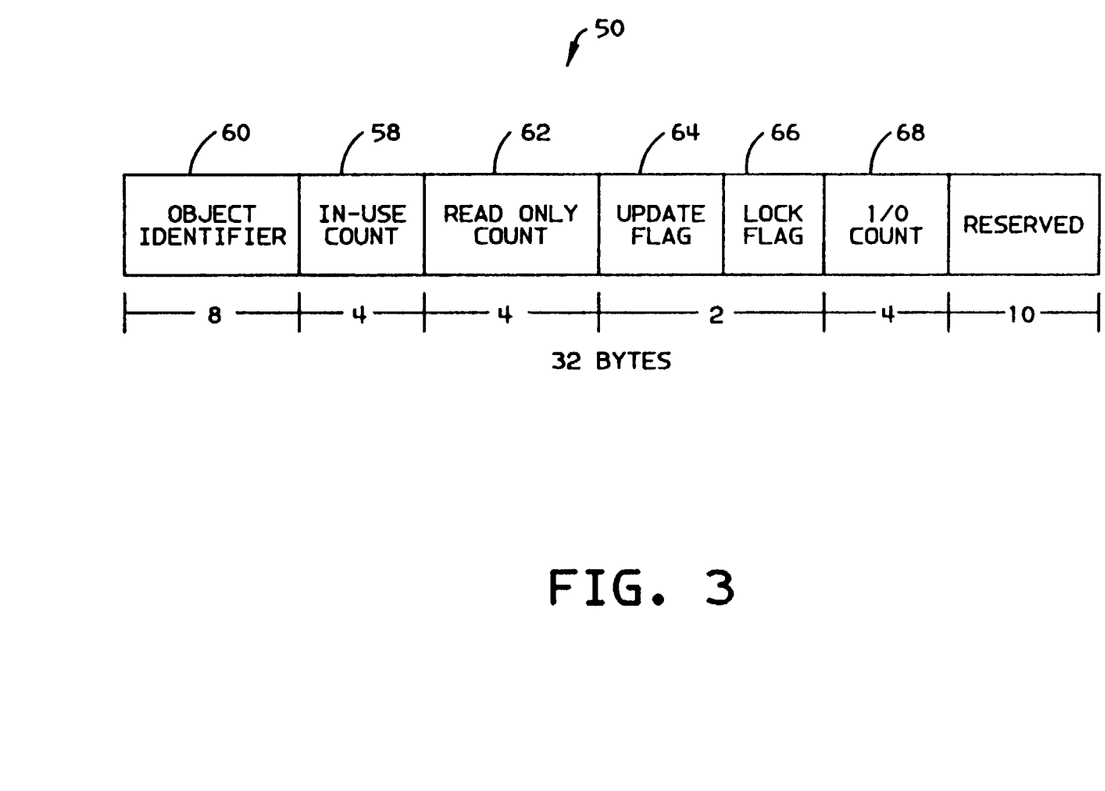
FIG. 3 is a block diagram of the fields in an entry of the in use table.

TABLE 5-continued end in_use_find;

Whenever a process begins using an object the in-use manager is invoked to perform an INCR (increment use-count) operation. If the object was not already in-use a new table entry indicated at 50 in FIG. 3 is allocated for the object and initialized with a use count 58 of 1. On the other hand, if the object is already in-use by others, the INCR operation simply maps to the pre-existing preferred slot using the slot address, and increments the count 58 stored therein. Notice that only 0 to 1 and 1 to 0 transitions regarding the use-count signify a genuine change in the recovery state of an object. It is the 0 to 1 transition which must efficiently reach non volatile secondary storage in order to provide adequate recovery information in the face of a crash. Whenever a 0 to 1 transition is made, the update flag 64 is also set in the slot entry.

Note that the actual recovery process is not part of this invention. The in use table is used to identify objects which may need recovery. The table is used during IPL following abnormal system termination. Thus, it is important that the slot entry be written to DASD prior to actual changes in the object.

In the preferred implementation on a single level store machine an object identifier 60 is simply the address of the object. For multi-level store machines, this may be simply an identifier such as a file name. The update flag 64 is used during recovery to determine whether or not an object needs special recovery actions performed. If the update flag is on, recovery of the object is done. A lock flag 66 is used to ensure that the entry is not changed by more than one process at any one point in time. It is used by the acquire entry and release entry function described in Tables 2 and 3.

An I/O count 6B is used to determine whether or not the entry has been written to secondary storage following a change to the entry. These fields will be discussed in further detail in later sections of the description.

The following pseudo code in Table 6 shows the method used for incrementing the use count of an object. There are three different cases encountered for the actual INCR function, and they are shown in Tables 7, 8, and 9. The following Tables use the shortened phrase, sync entry, to refer to the item called: preferred synchronization slot, elsewhere.

TABLE 6

```
Procedure INCR ( object_id, entry_info )
  Repeat { loop until an entry is allocated }
    concurrent_lock (object_id, entry_address);
    if { the synch_entry is unallocated
         entry_address -> use_count = 0
    then { Store the fresh object information in
           this slot
           INCR_case_1(entry_address); { See Table 7}
    else if { the entry locked already represents
              the data base object whose use-count
              is to be incremented
              entry_address -> object_address =
                               object_id
    then
           INCR_case_2; { See Table 8 }
    else { The entry we've locked is allocated to
           some other object, so a new table entry
           will need to be allocated
           INCR_case_3; { See Table 9 }
  UNTIL Incr_processing = complete ;
  if { The surrounding Data Base manager is
       dependent on the recovery information
```

TABLE 6-continued

```
       being stored in this slot and therefore
       requires the recovery state to be written
       to DASD }
   ensure_level = ensure_all OR ensure_level =
                                 ensure_specific
then
   Handle_in_use_Ensurance; { Provides
       support for assuring that a write
       from main memory to DASD is scheduled
       and performed efficiently }
end Incr Procedure;
```

Contention is likely to arise against such a table from two primary sources: Simultaneous attempts to lock the same slot, and attempts to modify a page of the table at the same time that some other job is attempting to write this page out to secondary storage. The use of the low overhead Compare-and-Swap mechanism coupled with the Concurrent-lock procedure described above addresses the first concern. Careful selection of free slot placement coupled with bundled write operations, described in greater detail below, help alleviate the second concern. A further alternative is the provision of a mechanism by which free slot placement is influenced by knowledge about which formerly modified pages of the table were still in the midst of experiencing I/O at the time a new slot needed to be assigned.

The following Table 7 describes the logic used when the probe into the in-use table finds an empty table entry. It is called from the code in Table 6. The entry is used for the object information.

TABLE 7

```
Procedure INCR_case_1 ( entry_address);
  begin
           Set_Object_in_use_pointer
              (entry_address);
           Initialize_entry(entry_address);
           Update_IO_ranges(entry_address);
              { I/O ranges are maintained in
                order to identify which portion
                of the in-use table has been
                modified recently but not yet
                written to DASD }
  Update_on_page_allocation_bite(entry_address);
           { Reveals that another slot on page has
             been consumed }
           INCR_processing := complete
  end
end INCR_case_1;
```

The following Pseudo code in Table 8, called from Table 6, describes the case when the probe into the in-use table finds an entry which points back to the object we are putting in use. That is; the object identifier stored in the in-use entry is the same as the object_id of the object being put in-use.

TABLE 8

```
Procedure INCR_Case_2 (entry_address);
  begin
       Update_entry(entry_address);
       Update_IO_ranges(entry_address);
       INCR_processing := complete
  end
end.
```

Once a new slot has been selected, it can be initialized as shown in a part of Table 9, following the statement that increment processing is complete. The last case, shown in Table 9, is when the probe into the in-use table finds a table entry which is allocated for some other object. This results in the allocation of a free entry while the synch_entry is held to synchronize table access for this object. Once the new entry is allocated and initialized, and the object is made to point to the new_in-use table entry, then the first acquired lock (that of the sync-entry) is released.

TABLE 9

```
Procedure INCR_case_3(entry_address);
    begin
        Allocate_new_entry(entry_address,
            New-entry@);
        if allocation_rc = success
        then
            incr_processing := complete;
            Set_Object_in-use_pointer (Object_id,
                New_entry@);
            Release_lock(Entry_address);
            Initialize_entry(new_entry@);
            Update_IO_ranges(new_entry@);
    Update_on_page_allocation_bitmap(new_entry@);
            Release_lock(New_entry@);
        else
            processing_complete := NOT_COMPLETE;
            Release_lock(Entry_address);
            Enlarge_in_use_table;
        end
```

The Decrement function of the in use manager allows a process to reduce the count of active users of an object, when it no longer needs to access the object. This function is to record that a user is no longer using the object (as might happen when a data base file is closed). The use count is decremented to show that one less user is sharing the object. When the use count associated with the object goes to 0, then the entry is de-allocated by turning off the appropriate bit of the on-page slot allocation bit-map. In Table 10, pseudo code for the Decrement Function (DECR) is shown.

TABLE 10

```
Procedure DECR ( object_id, Var Object_info,
Return_code );
    concurrent_lock (object_id, entry_address);
    if entry_address -> entry.object_address =
            object_ID
    { Entry represents for which DECR is being
    performed }
    then
        begin
            { Return information found in in-use
            table for this entry to the user. }
            Return_entry_info(entry_address,
                entry_info);
            Decrement the Use Count;
            Return_code := Object_found;
            if { the use count is now 0
            then
                begin
                    {Turn on the bit in the on-page
                    bitmap associated with this
                    slot. This indicates that this
                    slot is unallocated. }
                    if { all bits in the on-page bitmap
                    for this page have a value of 1}
                    then
                        { Toggle the bit in the page
                        allocation bitmap
                        corresponding to the page
                        containing the slot just
                        decremented to 0 }
                end
        else { Object is not in - use }
        begin
            return_code := Object_not_in_use;
        end
    Release_lock(Entry_address);
```

Figure 4:
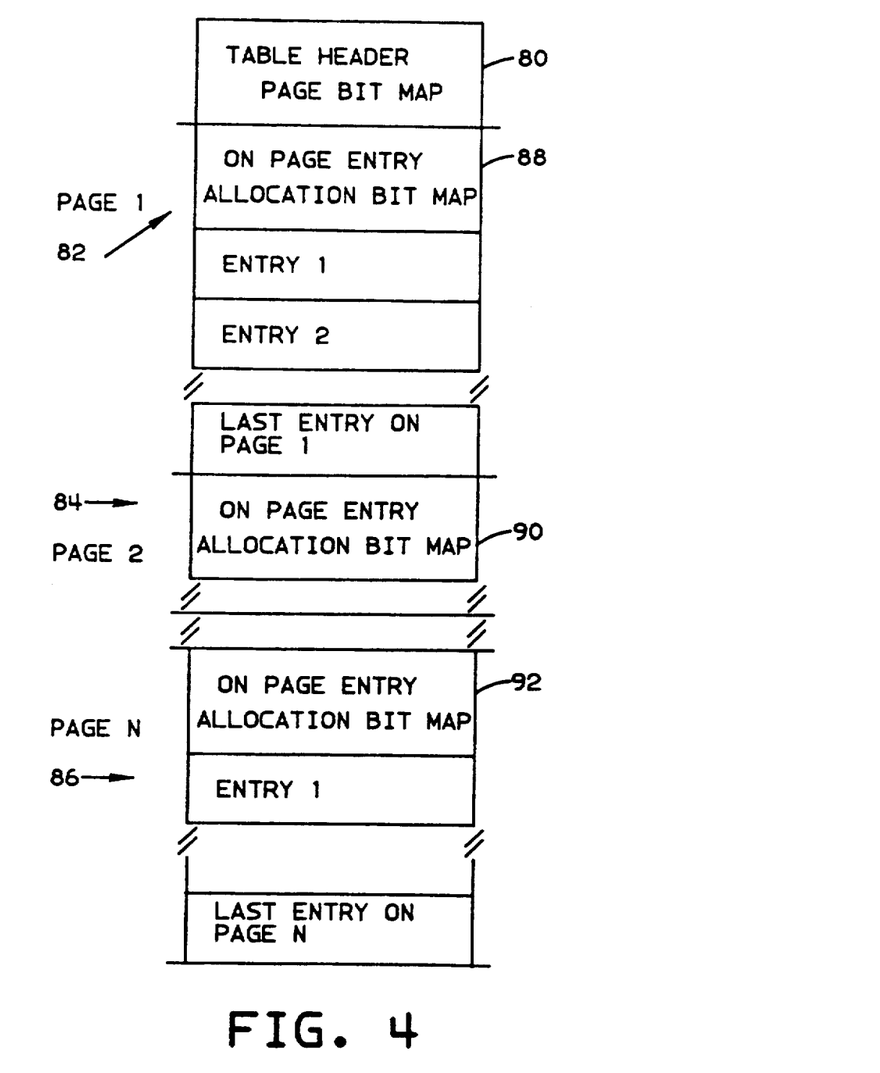
FIG. 4 is a block diagram of the in use table having multiple entries.

TABLE 10-continued end DECR Procedure;

The in use manager finds and allocates entries in the in-use table. The allocation is required when the INCR function chooses a synch entry which is already allocated to an object other than the object being put in-use. The structure of the in use table is shown in FIG. 4. There are three distinct parts of the in-use table structure. An in use table control information header 80 includes a first and last entry address which thereby designate the ensure required range, a size of table indication, and a number of entries in the table value. Also included is a count of the number of I/O write operations issued for the entire table. The table comprises an in use entry section which contains the slots, or entries containing in use information about the objects. The entry section consists of 512 byte logical pages, 82, 84 and 86 each containing 16 entries in one preferred embodiment. Each page can be separately written to DASD. Each page has self contained entry allocation information in the form of entry allocation bit maps, 88, 90 and 92. The entry bit maps comprise 16 bits indicating the status of each entry on the page.

A page allocation bit map in the header 80 of the table indicates which pages of the table have available entries. The jth bit of the page allocation bit-map represents the jth logical page of the entry section of the table. Each bit represents the allocation state of a page in the In-Use entry section. The bit has a value of 1 if the page it represents is full. A 0 value means there is still space available on the logical page.

As referred to above, the in use table is broken into logical pages each containing 16 entries. In addition to object-related in use status information shown in FIG. 3, the very first entry of each logical page also contains a 16 bit field which is referred to as the on page entry allocation bit map. The leftmost bit represents the allocation status of the first entry on the surrounding logical page containing the bit-map. The 2nd bit from the left represents the allocation status of the 2nd entry on the logical page, and so on. The rightmost bit of the on page entry bit map represents the allocation status of the 16th entry on the logical page. The ith bit of the on page entry bit map can only be changed when the corresponding entry on that page has been locked via the acquire entry procedure described earlier. All accesses to the on page entry bit map are preferably performed using an atomic instruction such as Compare and Swap to ensure that only the desired bit is changed.

Allocating Entries

As can been seen from the INCR function, the first step in trying to allocate an entry is to map the object to a synchronization entry and check if the synchronization entry can be used. The first case to consider involves the entry not being already allocated to a different object. It is then allocated and the on page entry allocation bit-map is updated. If the logical page becomes full as a result of this allocation, the corresponding bit of the page allocation bit-map 80 is TOGGLED because the page has gone from a not full to a full state. The toggling of the bit is done atomically to ensure that all processors see the correct data when they next access the bit. A page can be in the process of becoming full on behalf of the actions of one process, and at the same time another process could be freeing an entry on the same page. Toggling the bit ensures that the correct status is present when the two operations are complete.

The second case arises when the preferred synchronization entry is already allocated for some other object. In this instance, the on page entry allocation bit-map 88 is examined to find an available entry on the same page. This is important because the processor may have already taken one page fault to bring in the page containing the synchronization point from secondary storage. It is desirable to avoid additional page faults by attempting to select a substitute slot from the same logical page already brought into main memory. If an entry on the same page as the synchronization entry is available, that entry is locked and allocated as in case 1 above. A page fault is thus easily avoided.

The third case to consider arises when the synchronization point was allocated to a different object, and examination of the on page entry bit map shows that all entries on the page were also allocated. This requires that a different page be selected. Since a full page is represented with a bit setting of one (1), finding a new page involves searching the page allocation bit map looking for a zero (0) bit. One could simply start searching through the page allocation bit map 80 starting at the first bit, but this would result in substantial contention for the first free page 82. The preferred method is to use that synchronization entry's offset into the table as input to yet another hash function that chooses a starting point in the page allocation bit map.

In the preferred embodiment, the page finding hash is performed so that slots are allocated in a more uniform manner. The offset is halved and then translated to a page number containing the halved offset. The search begins with the byte in the page allocation bit map containing the nth bit where n is the page number found by the just mentioned translation.

Another feature of the preferred implementation technique makes use of a common Translate and Test instruction to search for the first zero (0) and also translate the bit pattern of the page allocation bit map to the bit number of the first zero (0) bit. This encoding of the bit number in the translate table saves the effort of scanning the byte.

High level Pseudo code for the general allocation of an entry is shown in Table 11. Case 1 mentioned above is not shown here because it is the first case of the INCR function already presented.

TABLE 11

Procedure Allocate_New_entry( entry_address, var
    new_entry@);
    Map_entry_to_page_address(entry_address,
        page_address);
    Try_to_allocate_entry_on_page(page_address,
        new_entry@, Try_page_Rc)
    While try_page_rc < > Success do
        Begin
            { Look for a page which appears to have
            available space }
            Find_Unallocated_page(entry_address,
                new_page_address);
            { Try to find an unallocated entry on the
            selected page }
            Try_to_allocate_entry_on_page
                (page_address, New_entry@,
                    Try_page_Rc)
    end Trying to allocate an entry once a page has been selected is fairly straight forward, and is shown in Table 12. But since the table manager is concurrent there is one interesting wrinkle. The on page entry bit map 88 is examined to determine a candidate entry. The examination is done using a compare and swap instruction to get a most current snapshot of the bit-map. The snapshot is examined to find the first unallocated entry on this page. Unallocated entries on the page are indicated in the on page entry bit map by 1 values. A hardware instruction is used to locate the first 1 bit in the bit-map. Many other alternative means of locating the first 1 bit are apparent to one skilled in the art. The next step is to gain exclusive control of the entry indicated from the snapshot of the bit-map. At this point, it is possible that a delay may be encountered if a concurrently executing process has exclusive control of the entry which was thought to be free. Hence, when the lock for this entry is finally granted, a fresh atomic snapshot of the bit-map must be acquired. The fresh snapshot is examined to make sure the bit corresponding to the locked entry is still a 1 meaning that the entry is still unallocated. If so, the bit is turned off and the new_entry@ is set to this new entry.

If upon obtaining exclusive control of the entry the reexamination of the on-page allocation bitmap revealed that the entry is already allocated, then the procedure checks the remaining bits of the bit-map and repeats the above process for another candidate entry. This process continues for this page until either an entry is successfully allocated, or no unallocated entries exist on the page.

TABLE 12

Procedure
    Try_to_allocate_entry_on_page ( page_address,
        new_entry@, Try_page_rc)
    get_snapshot_of_bitmap (page_address,Var
        bitmap)
    Find_first_1_bit(bitmap,Var bit_number,
        Entry_number);
    Acquire_lock(Entry_number);
    trypage_rc = Do_not_know_yet;
    Repeat { Until an entry is allocated, or no
        more free entries on page }
        get_snapshot_of_bitmap (page_address,Var
            bitmap)
        if { the bit is still set to 1 }
            Bit_test( bit-map, bit_number) = 1
        then { we can allocate the entry .
            begin
                { Turn off the bit to show entry
                allocated }
                Reset_Bit ( Var bitmap, bit_number )
                Trypage_rc := Success;
            end
        Else if { every slot on this logical page is
            now allocated }
            bitmap = 0
        then Trypage_rc := Failure;
    Until trypage_rc = success OR Trypage_rc =
        failure The following Pseudo code in Table 13 describes how a candidate page is selected using the Page allocation bit map 80.

TABLE 13

Procedure
    Find_Unallocated_page(entry_address,
        new_page_address);
    { Choose a point in the bit-map where search
        should begin.}
    starting_bit := (entry_address -
        first_entry_address )/
        pagesize / 2
    starting_byte := starting_bit / 8 + 1
    scan_bitmap (starting_byte, var stop_byte,
        bit_number, rc)

TABLE 13-continued

```
{ Calculate the proper page_number from
   bitmap }
Page_number := stop_byte *8 + bit_number - 1;
{ determine the actual page address of the
   candidate page. }
page_address := first_entry_address +
                page_number * pagesize;
```

Minimizing I/O

The in use manager minimizes I/O by only performing I/O to save entries to nonvolatile storage when absolutely needed. To achieve this, several fields are added to the table header. First, there are the "high boundary" and "low boundary" pointers which indicate the range of table entries which require forcing. Forcing is used in the sense that the range of table entries will be forced or written from main, volatile storage to nonvolatile secondary storage. It is a common operation performed in a paging environment. The pointers are initialized to indicate that no entries need forcing. Also in the table header is a count field which is incremented just before each I/O is started, and just after it completes thus indicating the pendency of I/O operations on the table. This count field is initialized to zero. This means that whenever the field is an even integer, no I/O is in progress, and whenever it is odd, an I/O is in progress. This fact will be used later. Each table entry also contains an I/O count field 68. By comparing the I/O count with the header count, a process can easily and efficiently determine whether a particular slot's contents have been written to auxiliary storage yet.

Since in an interactive computing environment, data base objects are generally put in use when the corresponding data base file is opened, but may not experience actual modification until a later time when the application program begins modifying the underlying data base, we have elected to separate the actions of placing an object in use (INCR) from the subsequent actions (often minutes later) of flagging the object as subject to recovery risks. This second step is signified by requesting that the in use table manager write the corresponding slot to auxiliary storage. (This is known as the ENSURE operation.) Hence, when an object is put in use, the table entry housing it need not be written to disk immediately. Rather, when the system is about to make the first change to an object that may require recovery, the in-use table manager is invoked to ensure that the corresponding table entry has been forced to disk. This permits several objects' entries to be written to secondary storage all at once, thereby minimizing the total number of I/O operations performed against the table as a whole. Some I/O overhead includes bus allocation processing, etc. Without this invention, the simple-minded approach would be to repetitively write the table anew if any change had been made anywhere within the table that had not yet been written. This means that the corresponding entry might have been written several I/O operations previously, and yet is still written again. By means of an even/odd count method described below, when the object is placed in use, the I/O count field 68 in the table entry is set to the value that the header count will be set to when the next full I/O operation has been done. If an I/O operation is currently in progress (the header field is odd), the entry field is set to the header field plus three. If the header field is even, the entry field is set to the header field plus two. The I/O count field is never changed from this point on, until the object is no longer in use. A simple comparison between the header field and the entry field is used to determine whether or not an I/O operation is required for the entry to ensure it is on secondary storage before a modification requiring recovery is made to the associated object.

Figure 5:
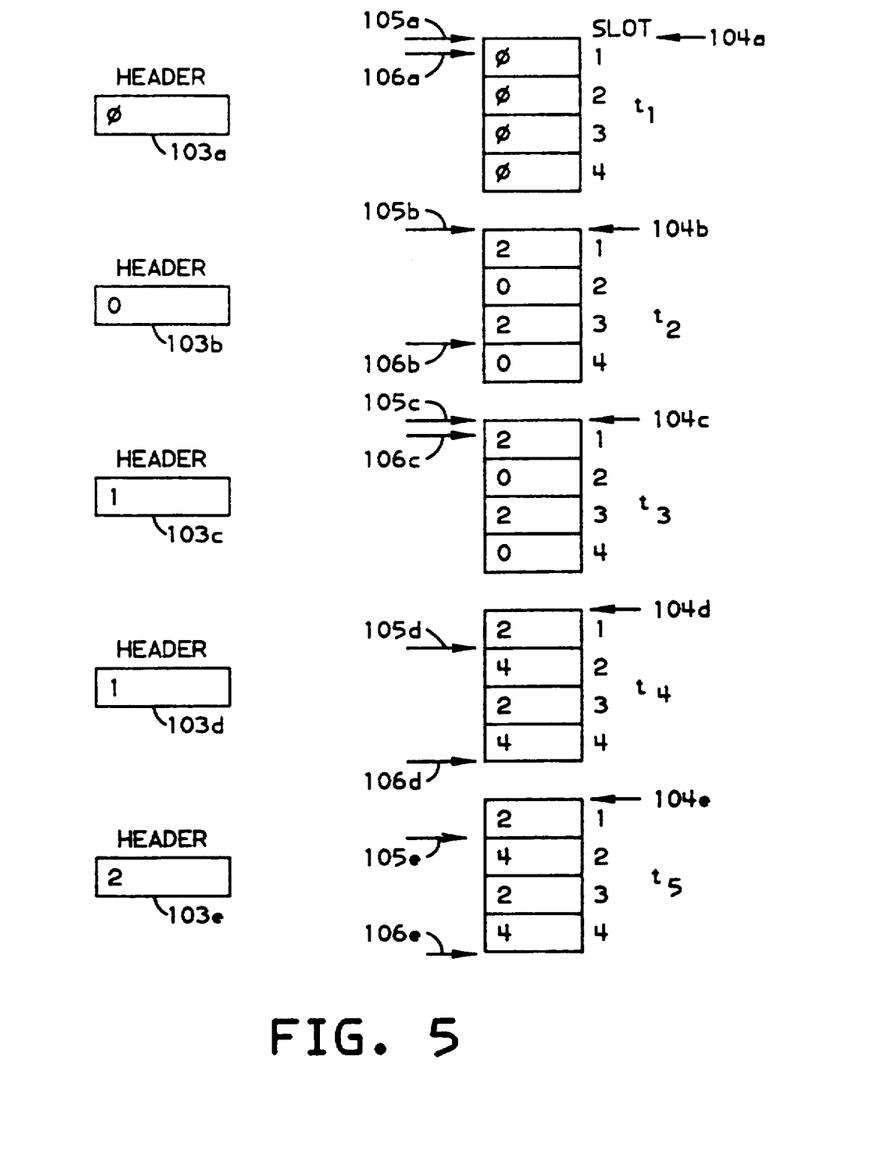
FIG. 5 is a sequential series of block diagrams of portions of the in use table showing counters related to I/O operations.

FIG. 5 shows a time ordered sequence depiction of the I/O count stored in the in use table header 103a, 103b, 103c, 103d, and 103e, along with sets 104a, 104b, 104c, 104d, and 104e of four table slots showing their I/O counts. At time t1, no activity has occurred and all values begin at zero (0). In addition, the low and high boundary indicators 105a and 106a are initialized to indicate NO slots need I/O.

At time t2, two slots have been allocated and marked with the I/O count which corresponds to the I/O count that will be in the header 103b when the next complete I/O operation has taken place. Since the next I/O will increment the header I/O count from 0 to 2, a 2 is placed in the first and third slots of set 104b. Also, the low and high boundary indicators 105b and 106b are adjusted to indicate which slots need to be written with the next I/O.

At time t3, an I/O has been initiated to write set 104c slots one and three to nonvolatile storage. The high and low boundary indicators 105c and 106c have been adjusted to indicate that no slots require an I/O. However, slots one and three still indicate that they have not been written to nonvolatile storage since their I/O counts are greater than the header I/O count. This is correct since the I/O has only been initiated and is not yet complete, as indicated by the 1 in the header I/O count.

At time t4, two more objects have been placed in use and have occupied table set 104d slots two and four. Accordingly, the high and low boundary indicators 105d and 106d have been adjusted. Since it cannot be determined if the changes to slots 2 and 4 will be written by the previously requested I/O (slot 2 might be, since it was within the previous high/low indicators, but 4 was not) they cannot be guaranteed to be written until the header I/O count reaches 4.

Note that even while the I/O is in progress for slots 1 and 3, changes can be made in volatile storage to slots 2 and 4 which reside in the same page as slots 1 and 3. This is accomplished by making a separate copy (cloning) of the page being written when a subsequent access is made to it. This effectively allows a page to be modified as it is being written.

At time t5, the first I/O operation has been completed and the header 103e I/O count updated to 2. This will serve to inform other processes that set 104e slots 1 and 3 have been successfully written to nonvolatile storage. This assures that another I/O will not be issued until it is required that slot 2 or slot 4 be written.

The implementation of the I/O reduction logic requires two locks for best performance. The first lock is obtained to limit access to the upper and lower boundaries of the I/O window (table entries between the pointers). This lock is held for the shortest of times, and is not held while an I/O operation is in progress to the holding task. So this lock does not impair performance. Simple procedures are used, and shown in the pseudo code to obtain and release the Limit lock.

A second lock, the I/O lock is used to limit the number of simultaneous I/O operations for the in use table to one. This was done so that subsequent requests which are started within a very short time period, can be reduced to one I/O operation. The scenario is as follows: Task 1 issues an I/O request to ensure some changes. (time t0) : Task 2 makes some changes and updates the window of I/O at time t1. : Task 1 now obtains the I/O lock and Limit lock at time t2. : An I/O operation is performed for task 1 consequently writing task 2's data. : Task 2 finally gains control of the I/O lock and discovers that the I/O operation has already been completed. Task 2 does not perform the I/O since it is unnecessary. For even better granularity, the method is also applicable to synchronization of I/O operations to multiple zones I/O of the in-use table. Each zone is allocated on separate DASD devices. One I/O operation is then performed for each zone. To achieve this the low and high boundaries as well as the I/O count are replicated for each zone (extent) of the table. Also, a limit and I/O lock are required for each zone. This extension provides improved performance for large tables which span several storage extents.

The implementation of this method logically breaks into two functional pieces. The first piece is invoked when the table entry is operated on via an increment operation. A Handle Update of Ensurance Information routine is invoked from the Increment procedure explained earlier. The pseudo code follows in Table 14.

TABLE 14

```
Procedure Handle in-use ensurance:
If { This entry has gone from a read-only state to
    a read-write thereby revealing that the object
    is about to be changed and needs to be
    classified as a candidate for potential
    recovery processing }
then
    Begin
        Obtain__in-use__limit__lock;
        IF { Lower boundary = 0, or address of table
            entry is less than the lower boundary}
        THEN { Set Lower Boundary to address of
            table entry. }
        IF { Address of table entry is greater than
            upper boundary of window }
        THEN { Set upper boundary to address of
            table entry }
        { Set the entry's i/o # to the future value
          of I/O number when this table entry is
          guaranteed to be written out. }
        DSIUIO# := (DSIUFRC# + 3) & (−2);
        { IF header__IO__count is odd
        THEN
            entry__IO__count = header__IO__count + 3
        ELSE
            entry__IO__count = header__IO__count + 2}
        Release__in-use__limit__lock;
        If { Invoker has asked us to assure that a
            specific slot be written to DASD AND
            the I/O count in the in use table
            header is less than this entry's I/O
            count and ensure__specific = True and
            Header__IO__count < Entry__IO__count}
        Then { Tell the force routine that a force
            is required because of a specific
            ensure. }
            FORCESPC := SET;
    End
End Handle__in-use__ensurance;
```

An In Use Force Routine handles the writing of the table entries to auxiliary storage when appropriate as shown in Table 15.

TABLE 15

```
Procedure In-Use__IO;
    Var CURIO INTEGER. { Snapshot of current I/O
                          counter. }
```

TABLE 15-continued

```
    FORCLO@ PTR, { Local copy of lower
                    bndry of force range}
    FORCHI@ PTR; { Local copy of upper
                    bndry of force range}
Begin
    If { The handle__ensure procedure has indicated
        that I/O is necessary, OR Global Ensure was
        requested }
    Then
        Begin
            { Set CURIO to the current value of the I/O
              counter. }
            Obtain__in-use__IO__lock; May be delayed here
                                during I/0 by
                                another process
            Obtain__in-use__Limit__lock;
            If { I/O hasn't been done since we tried to
                get the locks and there is some I/O to
                perform }
            Then
                Begin
                    { Set FORCLO@ to current value of the
                      BOTTOM of I/O range}
                    { Set FORCHI@ to current value of the
                      TOP of I/O range}
                    { Clear Lower and Upper limits of I/O
                      range }
                    { Increment the I/O count once before
                      I/O is performed }
                    Release__in-use__LIMIT__lock; { Letting
                        other allocations take place. }
                    Write__storage(forclo@, forchi@);
                    { Increment the I/O count once after
                      I/O is performed }
                    Release__IN-USE__IO__lock;
                End
            Else
                Begin
                    Release__inuse__limit__lock;
                    Release__in-use__IO__lock;
                End
        End
End.
```

Some objects may not need recovery following abnormal system termination if they had not been changed by any of the processes accessing them. Some objects are placed in-use for both read only and read/write functions. Prior to this invention, when an object was not placed in use for read/write purposes, but had been put in use solely for read only operations, and the system failed, restart processing was not able to distinguish between the read only and read/write in-use statuses, and hence read only objects underwent recovery processing needlessly. The in use manager avoids this inefficiency by keeping track with a separate bit (update flag 68) in the table entry which will indicate if the object had ever been placed in use for read/write purposes. This bit indicates whether or not the object should be recovered should the system fail.

When ensuring individual entries, the surrounding page(s) containing the entries are written to auxiliary storage. Several methods are used to reduce contention caused by I/O operations which are pending. One method involves copying the contents of the real storage frame of main memory to a clone frame. One is then free to access the clone frame directly, while the original storage frame is available to be written out to secondary storage. Other techniques developed to minimize I/O contention include placing an I/O pending bit in the page allocation bitmap to keep track of which pages were currently being written to storage. The FIND__Unallocated__page procedure described earlier is used to search for pages which are not full and which are not currently being written to auxiliary storage thereby avoiding the need to clone a page frame as described above. An encoding was developed which allowed a Translate and test instruction to efficiently search a bit string where two adjacent bits represent I/O pending status and allocation status of each page. In one scan of the bit-map the proper free and available page are selected.

In a further preferred embodiment, since there are many entries per page, it is desirable to reflect that all neighboring entries have been written to auxiliary storage by a page-out operation intended for a specific entry. The idea is to turn on a bit in an entry when the entry is first allocated. A one value indicates that the entry has not been written to auxiliary storage. When a page-out operation is performed, a storage management exit is invoked which turns this bit off for each entry on the page being written. This prevents the need to turn off the bit outside of storage management since doing so would mark the page as changed, and thus trigger yet another page I/O. The Storage management exit must recognize that the page-out is for table entries of the in-use table. The recognition was made easy on the Application System/400 because the in-use table is recognized by it's virtual address.

A further method of reducing contention involves the use of shadow pages. In the absence of the above mentioned clone method, I/O contention is reduced by having two tables which mirror one another. The first table is used for reading and updates. The first table is never explicitly written to auxiliary storage at the request of the in use manager. All updates are copied from the first table into the shadow. When the table entry must be forced, then the shadow portion is written to auxiliary storage. This leaves the first table available for unlimited references and high levels of concurrency irrespective of the I/O traffic. If updates are made to the first table which do not need to be ensured, then the copying of the update may be deferred until an update to the page is made which needs to be ensured. Contention is limited to the times when updates are being copied from the first table to the shadow.

While the present invention has been described in terms of a preferred embodiment, it will be recognized that alternative embodiments are within the scope of the invention as claimed. The benefits of identifying slots without serially searching could be achieved by methods other than the particular hash described. There are also alternatives to the atomic operations described. Further, in multiprocessor environments, the in use table may be split between processors, or reside entirely on one processor, dependent on the addressing schemes employed.

What is claimed is:

1. An in-use table manager comprising:
   means for assigning an object, having a header, to a slot in an in-use table having an allocation bit map, and for hashing an address of said object into a preferred slot address;
   means for checking an object identifier in a preferred slot at said preferred slot address;
   means for assigning an alternative slot address if said object identifier does not match an address of said object by checking said allocation bit map to find an unassigned slot;
   means for inserting a slot address into said header of said object;
   means for locking individual slots in said in-use table to prevent concurrent access, each of said slots being locked by a lock indication contained in said slot, said slot being selected via a slot address;
   means for providing an indication of use of an object, said indication of use being contained in a slot, said slot being selected via said slot address; and
   means for modifying said indication of use to indicate desired recovery actions for each object.

2. The in-use table manager according to claim 1, wherein said means for assigning an object to a slot further comprises means for checking said header of said object to determine if a slot address has been inserted.

3. The in-use table manager according to claim 1, wherein the in-use table comprises:
   a plurality of pages, each page containing a slot allocation bit map, and a plurality of slots for containing in-use information about objects; and
   a header which has a page allocation bit map for indicating pages which have unassigned slots.

4. The in-use table manager according to claim 3, wherein said means for assigning an alternative slot address first checks said slot allocation bit map to find an unassigned slot to avoid excess page faults.

5. The in-use table manager according to claim 4, wherein said means for assigning an alternative slot address checks said page allocation bit map to find a page with an unassigned slot.

6. The in-use table manager according to claim 1, further including:
   first means for indicating a slot nearest the top of the in-use table which has been changed; and
   second means for indicating a slot nearest the bottom of the in-use table which has been changed.

7. The in-use table manager according to claim 6, further including:
   means for detecting when an object will be changed; and
   means for forcing said slots bounded by said indication of said first means and said indication of said second means to non-volatile storage prior to an object being changed.

8. The in-use table manager according to claim 1, further including:
   means for detecting an invalid slot address in said header of an object; and
   means for reassigning a valid slot address if an invalid slot address has been detected.

9. A high concurrency database system comprising:
   a plurality of processes;
   a plurality of objects containing database information for accessing by said processes;
   an in-use table having a header and a plurality of slots, each of said slots capable of indicating the in-use status of an object; and
   an in-use manager, comprising:
      means for assigning an object, having a header, to a slot in said in-use table having an allocation bit map, and for hashing an address of said object into a preferred slot address;
      means for checking an object identifier in a preferred slot at said preferred slot address;
      means for assigning an alternative slot address if said object identifier does not match an address of said object by checking said allocation bit map to find an unassigned slot;

means for inserting a slot address into said header of said object;

means for locking individual slots in said in-use table to prevent concurrent access, said individual slots being locked by a lock indication contained in each of said slots, each of said slots being selected via a slot address contained in each of the headers of each of the objects which have been assigned a slot;

means for providing an indication of use of an object, said indication of use being contained in each of said slots, each of said slots being selected via a slot address contained in said headers of an object that have been assigned a slot; and means for modifying an indication of use contained in each of said slots to indicate desired recovery actions for each of said objects that have been assigned a slot.

10. The high concurrency database system according to claim 9, wherein said means for assigning an object to a slot further comprises means for checking a header of said object to determine if a slot address has been inserted.

11. The high concurrency database system according to claim 9, wherein said in-use table comprises:
- a plurality of pages, each page containing a slot allocation bit map, and a plurality of slots for containing in-use information about objects; and
- a header which has a page allocation bit map for indicating pages which have unassigned slots.

12. The high concurrency database system according to claim 11, wherein said means for assigning an alternative slot address first checks said slot allocation bit map to find an unassigned slot to avoid excess page faults.

13. The high concurrency database system according to claim 12, wherein said means for assigning an alternative slot address checks said page allocation bit map to find a page with an unassigned slot.

14. The high concurrency database system according to claim 9, further comprising:
- first means for indicating a slot nearest the top of said in-use table which has been changed; and
- second means for indicating a slot nearest the bottom of said in-use table which has been changed.

15. The high concurrency database system according to claim 14, further comprising:
- means for detecting when an object will be changed; and
- means for forcing said slots bounded by said indication of said first means and said indication of said second means to non-volatile storage prior to an object being changed.

16. A mechanism for writing individually modifiable entries within a table to nonvolatile storage by I/O operations, said mechanism comprising:
- means for indicating pendency of I/O operations on said table, said means for indicating pendency being contained within said table;
- means for indicating a requirement for each entry to be written to nonvolatile storage, said means for indicating a requirement to be written being contained within each entry within said table; and
- means for comparing said means for indicating pendency of I/O operations with said means for indicating a requirement for each entry to be written to nonvolatile storage to determine whether contents of each entry should be written to nonvolatile storage.

17. The mechanism according to claim 16, wherein said means for indicating pendency of I/O operations on said table comprises means for incrementing an I/O count in a header of said table by one at a beginning of each I/O operation and at an end of each I/O operation.

18. The mechanism according to claim 17, wherein said means for indicating a requirement for each entry to be written to nonvolatile storage comprises means for incrementing a count in each entry based upon said I/O count in said header of said table.

19. The mechanism according to claim 18, wherein said means for indicating a requirement for each entry to be written to nonvolatile storage further includes means for increment said count in each entry by two if said I/O count is even.

20. The mechanism according to claim 19, wherein said means for indicating a requirement for each entry to be written to nonvolatile storage further includes means for increments said count in each entry by three if said I/O count is odd.

21. The mechanism according to claim 20, wherein said means for comparing said means for indicating pendency of I/O operations with said means for indicating a requirement for each entry to be written to nonvolatile storage comprises means for indicating that an entry has been written to nonvolatile storage if said I/O count is greater than or equal to said count in said entry.

* * * * *